US007490412B1

(12) United States Patent
Gupta

(10) Patent No.: US 7,490,412 B1
(45) Date of Patent: Feb. 17, 2009

(54) DRAFTING TOOL

(76) Inventor: Jennifer L. Gupta, 24 The Avenue, London (GB) N10 2QL ( * ) Notice: Subject to any disclaimer, the term of this patent is extended or adjusted under 35 U.S.C. 154(b) by 0 days.

(21) Appl. No.: 11/755,647

(22) Filed: May 30, 2007

(51) Int. Cl.
*G01B 3/04* (2006.01)
*G01B 3/14* (2006.01)

(52) U.S. Cl. .......................................... 33/492; 33/562

(58) Field of Classification Search .................. 33/492, 33/452, 465, 483, 484, 485, 489, 490, 562, 33/563, 564, 565, 566
See application file for complete search history.

(56) References Cited

U.S. PATENT DOCUMENTS

| | | | | |
|---|---|---|---|---|
| 305,665 | A * | 9/1884 | Castles | 30/123 |
| 470,754 | A * | 3/1892 | Hartig | 33/483 |
| 684,142 | A * | 10/1901 | Ward | 269/87.1 |
| 970,586 | A * | 9/1910 | Whitaker | 269/2 |
| 1,022,384 | A * | 4/1912 | Bahr | 33/564 |
| 2,204,353 | A * | 6/1940 | Fulton | 33/485 |
| 2,230,010 | A * | 1/1941 | Owens | 33/489 |
| 2,246,491 | A * | 6/1941 | Abell | 33/489 |
| 2,585,421 | A * | 2/1952 | Armand | 116/240 |
| 4,246,702 | A | 1/1981 | Burt | |
| 4,435,906 | A * | 3/1984 | Mori | 33/628 |
| 5,337,484 | A | 8/1994 | Cardon | |
| 5,941,171 | A | 8/1999 | Fromm | |
| 6,349,479 | B1 * | 2/2002 | Bottega | 33/481 |
| 6,820,546 | B2 | 11/2004 | Wynne | |
| 6,829,990 | B2 | 12/2004 | Cochran et al. | |
| 2008/0022542 | A1 * | 1/2008 | Brosmith et al. | 33/562 |

* cited by examiner

*Primary Examiner*—Christopher W Fulton
(74) *Attorney, Agent, or Firm*—Crossley Patent Law; Mark A. Crossley

(57) ABSTRACT

A drafting tool that is designed to assist an individual in drafting words or designs in perfect lines, curves, or diagonals. The drafting tool is similar to a standard ruler and includes a base, a top section, and a hinge connecting the base to the top section. A portion of the top section is placed against the base, allowing a stencil to be held in place between these two portions. A series of markings on the top surface of the top section will allow an individual to properly position the stencil in relation to the drafting tool and also the item that is or will be written on by an individual.

10 Claims, 3 Drawing Sheets

DRAFTING TOOL

BACKGROUND OF THE INVENTION

The present invention concerns that of a new and improved drafting tool that is designed to assist an individual in drafting words or designs in perfect lines, curves, or diagonals.

DESCRIPTION OF THE PRIOR ART

U.S. Pat. No. 4,246,702, issued to Burt, discloses a stenciling device which holds a stencil in a particular position.

U.S. Pat. No. 5,941,171, issued to Fromm, discloses a device which holds stencils in an aligned position.

U.S. Pat. No. 6,829,990, issued to Cochran et al., discloses a stencil assembly which holds letter stencils in a straight line.

U.S. Pat. No. 6,820,546, issued to Wynne, discloses a structure which aligns stenciled print.

U.S. Pat. No. 5,337,484, issued to Cardon, discloses a device which assures that stenciled writing is done in a straight line.

SUMMARY OF THE INVENTION

The present invention concerns that of a new and improved drafting tool that is designed to assist an individual in drafting words or designs in perfect lines, curves, or diagonals. The drafting tool is similar to a standard ruler and includes a base, a top section, and a hinge connecting the base to the top section. A portion of the top section is placed against the base, allowing a stencil to be held in place between these two portions. A series of markings on the top surface of the top section will allow an individual to properly position the stencil in relation to the drafting tool and also the item that is or will be written on by an individual.

There has thus been outlined, rather broadly, the more important features of a drafting tool that the detailed description thereof that follows may be better understood and in order that the present contribution to the art may be better appreciated. There are, of course, additional features of the drafting tool that will be described hereinafter and which will form the subject matter of the claims appended hereto.

In this respect, before explaining at least one embodiment of the drafting tool in detail, it is to be understood that the drafting tool is not limited in its application to the details of construction and to the arrangements of the components set forth in the following description or illustrated in the drawings. The drafting tool is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present drafting tool. It is important, therefore, that the claims be regarded as including such equivalent constructions insofar as they do not depart from the spirit and scope of the present invention.

It is therefore an object of the present invention to provide a drafting tool which has all of the advantages of the prior art and none of the disadvantages.

It is another object of the present invention to provide a drafting tool which may be easily and efficiently manufactured and marketed.

It is another object of the present invention to provide a drafting tool which is of durable and reliable construction.

It is yet another object of the present invention to provide a drafting tool which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
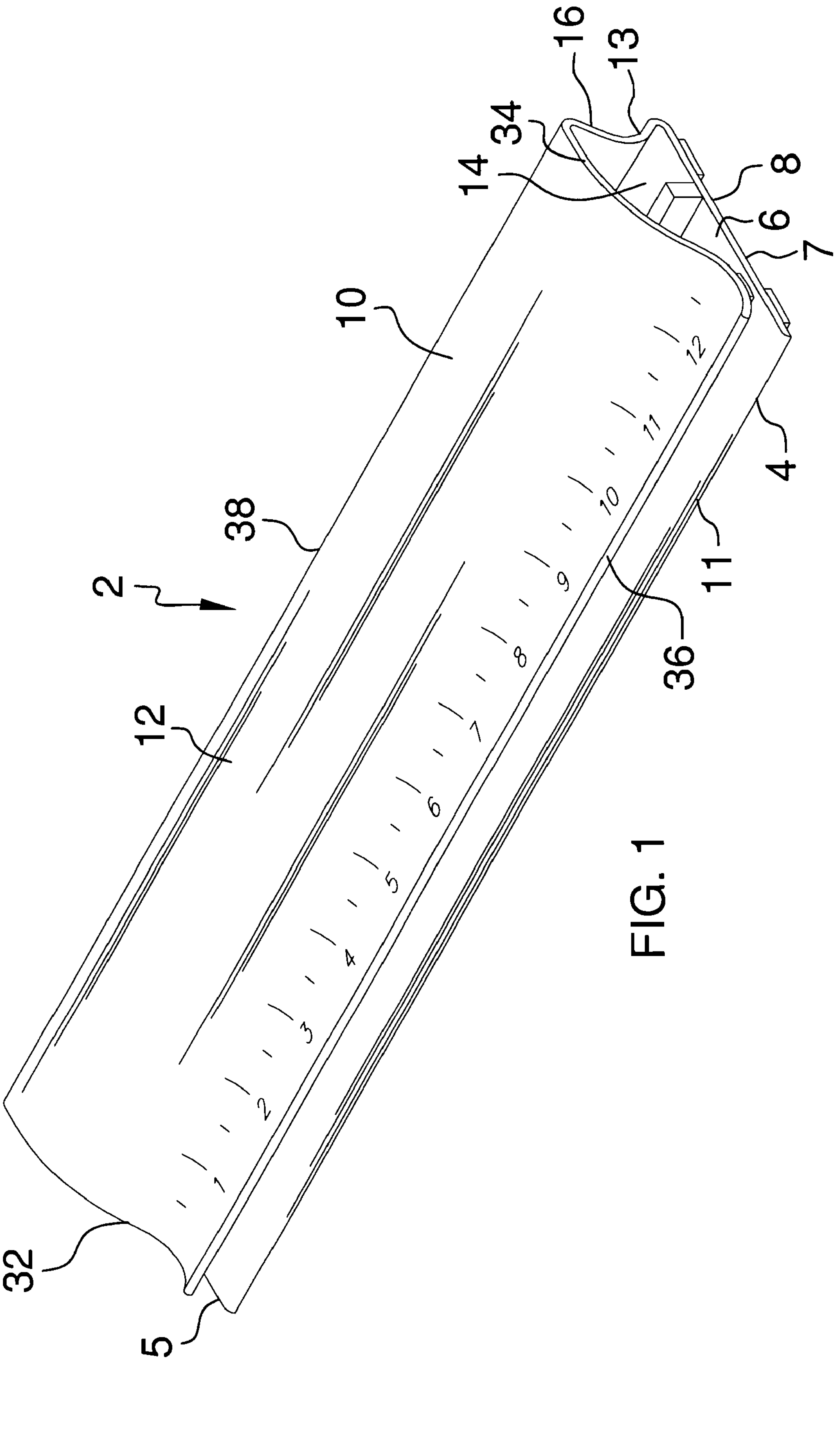
FIG. 1 shows a front perspective view of the drafting tool.
Figure 2:
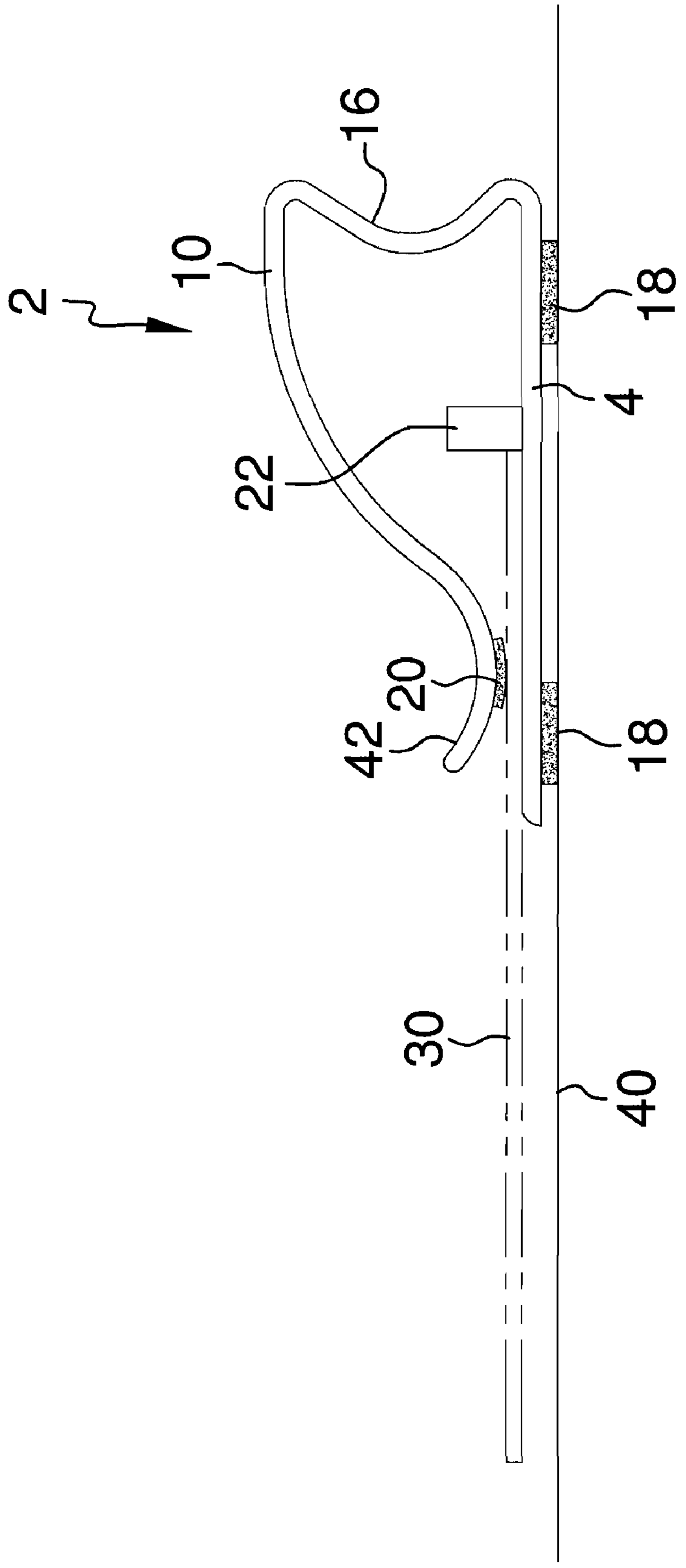
FIG. 2 shows a side view of the drafting tool.
Figure 3:
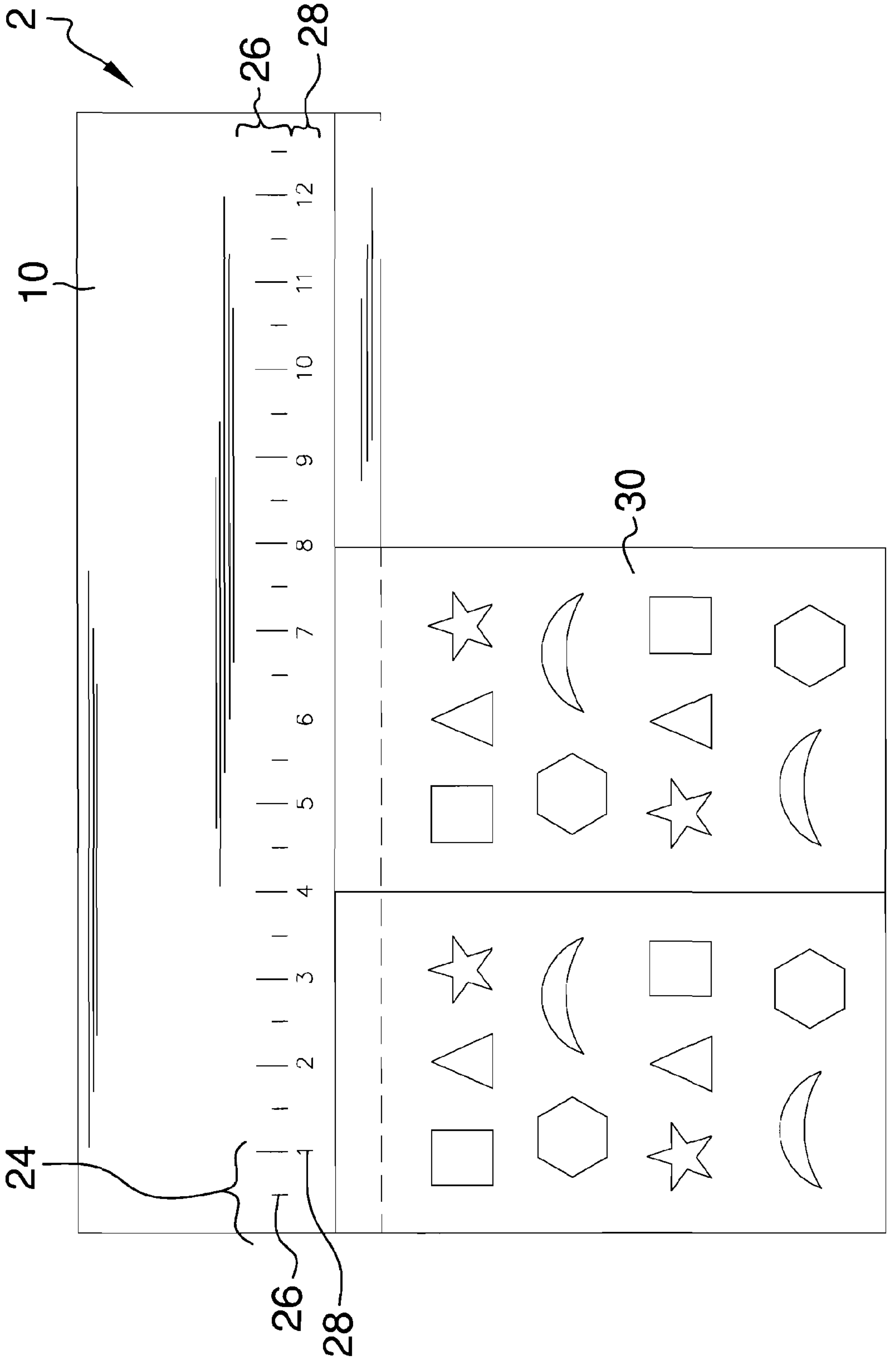
FIG. 3 shows a top view of the drafting tool as it would appear with a stencil attached in between the top section and the base of the drafting tool.

With reference now to the drawings, and in particular to FIGS. 1 through 3 thereof, a new drafting tool embodying the principles and concepts of the present invention and generally designated by the reference numeral 2 will be described.

As best illustrated in FIGS. 1 through 3, the drafting tool 2 comprises a base 4 that has two ends comprising a first end 5 and a second end 7, and furthermore, has two surfaces comprising a top surface 6 and a bottom surface 8. Finally, the base 4 has two side edges comprising a front side edge 11 and a rear side edge 13.

The base 4 could have a variety of shapes, but preferably, has a rectangular shape. Furthermore, while base 4 could have a wide variety of lengths, the preferred length would anywhere between twelve (12) to eighteen (18) inches. The preferred width is approximately two (2) inches.

A top section 10 is also present. Top section 10 has two ends comprising a first end 32 and a second end 34, and furthermore, has two surfaces comprising a top surface 12 and a bottom surface 14. Finally, the base 4 has two side edges comprising a front side edge 36 and a rear side edge 38.

The bottom surface 14 of the top section 10 near the rear side edge 38 of the top section 10 is pivotally attached, through hinge 16, to the top surface 10 of the base 4 near the rear side edge 13 of the base 4. Hinge 16 preferably is somewhat rigid that has a little elasticity, allowing the hinge 16 to also serve as structural support between the base 4 and top section 10.

The top section 10 of the drafting tool 2 wraps downward toward the base 4 of the drafting tool 2 as one travels from the rear side edge 38 of the top section 10 to the front side edge 36 of the rear side edge 38. The bottom surface 14 of the top section 10 is connected to the top surface 6 of the base near the front side edge 11 of the base 4. Ideally, a series of inner foam pads 20 are used to shield actual contact in between the base 4 and the top section 10 of the drafting tool 2. The last small portion of the front side edge 36 of the top section 10 actually has a small, upward curl shape 42 to it, allowing an individual to easily grasp the top section 10 if and when this would be needed.

In addition to the inner foam pads 20, a series of external foam pads 18 and used with the present invention. Each foam pad 18 is ideally attached to the bottom surface 8 of the base 4, with the goal of using the foam pads 18 being to serve as a protection in between the drafting tool 2 and a flat surface 40, such as a table or other similar surface.

The top surface 12 of the top section 10 has a plurality of markings 24 on it, with the markings ideally measuring off in inches. The markings 24 comprise both indicator markings 26, which preferably are a plurality of lines that are spaced out with a frequency of at least once per inch, and furthermore, the markings 24 also comprise a plurality of numerical markings 28, which are matched up with the indicator markings 26 to an individual can provide objective readings to the indicator markings 26 while he or she is using the drafting tool 2.

In use, an individual would take a stencil 30 and slightly raise the front side edge 36 of the top section 10 by grasping the upward curl 42 portion of the front side edge 36 of the top section 10. The stencil 30 would be slid underneath the top section 10, at which time, it would be lowered so that it would hold the stencil 30 in between the top section 10 and the base 4. A plurality of backstops 22, which are attached to the top surface 6 of the base 4, would limit how far the stencil 30 into the area in between the top section 10 and the base 4. Each of the backstops 22 are collinear with one another, ensuring that the stencil 30 has an equal depth each time it is entered and/or placed underneath the top section 10 of the drafting tool 2. Once properly connected, the stencil 30 can be used to ensure that a straight lines, curves, and diagonals can easily be drafted.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A drafting tool comprising a base, the base having two ends comprising a first end and a second end, the base further having two surfaces comprising a top surface and a bottom surface, the base further having two side edges comprising a front side edge and a rear side edge, a top section, the top section having two ends comprising a first end and a second end, the top section further having two surfaces comprising a top surface and a bottom surface, the top section further having two side edges comprising a front side edge and a rear side edge, and means for connecting the base to the top section, wherein the means for connecting the base to the top section further comprises a hinge, wherein the hinge connects the bottom surface of the top section near the rear side edge of the top section to the top surface of the base near the rear side edge of the base, wherein the hinge has a small amount of elasticity, wherein the drafting tool further comprises a plurality of external foam pads, wherein each external foam pad is attached to the bottom surface of the base, wherein the drafting tool further comprises means for making straight lines and curves, wherein the means for making straight lines and curves further comprises a stencil, means for attaching the stencil to the drafting tool, and means for limiting the degree to which the stencil can be inserted into the drafting tool, wherein the means for attaching the stencil to the drafting tool further comprises (a) a plurality of inner foam pads attached to the bottom surface of the top section, (b) wherein the bottom surface of the top section is connected to the top surface of the base near the front side edge of the base, (c) means for grasping the top section to temporarily move it slightly upward so that items can be placed in between the base and the bottom surface of the top section.

2. A drafting tool according to claim 1 wherein the means for grasping the top section to temporarily move it slightly upward so that items can be placed in between the base and the top section further comprises an upward curled portion, the upward curled portion being attached to the front side edge of the top section.

3. A drafting tool according to claim 2 wherein the means for limiting the degree to which the stencil can be inserted into the drafting tool further comprises (a) a plurality of back stops attached to the top surface of the base, (b) wherein each of the back stops are co-linear with one another, (c) further wherein the front side edge of the top section can be raised, allowing an individual to insert a stencil until the stencil comes into contact with the plurality of back stops, (d) further wherein once the top section is lowered, the plurality of internal foam pads come into contact with the stencil, thereby keeping the stencil in place.

4. A drafting tool according to claim 3 wherein the drafting tool further comprises means for measuring distances on an objective scale.

5. A drafting tool according to claim 4 wherein the means for measuring distances on an objective scale further comprises a plurality of markings located on the top surface of the top section.

6. A drafting tool according to claim 5 wherein the plurality of markings located on the top surface of the top section further comprises a plurality of indicator markings.

7. A drafting tool according to claim 6 wherein the plurality of markings located on the top surface of the top section further comprises a plurality of numerical markings.

8. A drafting tool according to claim 6 wherein the length of the base is between twelve to eighteen inches, and further wherein the width of the base is two inches.

9. A drafting tool comprising (a) a base, the base having two ends comprising a first end and a second end, the base further having two surfaces comprising a top surface and a bottom surface, the base further having two side edges comprising a front side edge and a rear side edge, (b) a top section, the top section having two ends comprising a first end and a second end, the top section further having two surfaces comprising a top surface and a bottom surface, the top section further having two side edges comprising a front side edge and a rear side edge, (c) means for connecting the base to the top section, said means comprising (i) a hinge, the hinge having a small amount of elasticity, (ii) wherein the hinge connects the bottom surface of the top section near the rear side edge of the top section to the top surface of the base near the rear side edge of the base, (d) a plurality of external foam pads, wherein each external foam pad is attached to the bottom surface of the base, (e) means for making straight lines and curves, said means comprising (i) a stencil, (ii) means for attaching the stencil to the drafting tool, said means further comprising (1) a plurality of inner foam pads attached to the bottom surface of the top section, (2) wherein the bottom surface of the top section is connected to the top surface of the base near the front side edge of the base, (3) means for grasping the top section to temporarily move it slightly upward so that items can be placed in between the base and the bottom surface of the top section, said means further comprising an upward curled portion, the upward curled portion being attached to the front side edge of the top section, and (iii) means for limiting the degree to which the stencil can be inserted into the drafting tool, said means further comprising (1) a plurality of back stops attached to the top surface of the base, (2) wherein each of the back stops are co-linear with one another, (3) further wherein the front side edge of the top section can be raised, allowing an individual to insert a stencil until the stencil comes into contact with the plurality of back stops, and (4) further wherein once the top section is lowered, the plurality of internal foam pads come into contact with the stencil, thereby keeping the stencil in place, (f) means for measuring distances on an objective scale, said means further comprising a plurality of markings located on the top surface of the top section, the plurality of markings further comprising a plurality of indicator markings, the plurality of markings further comprising a plurality of numerical markings.

10. A drafting tool according to claim 9 wherein the length of the base is between twelve to eighteen inches, and further wherein the width of the base is two inches.

* * * * *